(12) United States Patent
Dhawan et al.

(10) Patent No.: US 9,190,100 B2
(45) Date of Patent: Nov. 17, 2015

(54) DETERMINING AT LEAST ONE OF ALIGNMENT AND BOND LINE THICKNESS BETWEEN AN OPTICAL COMPONENT AND A MOUNTING SURFACE

(71) Applicant: Seagate Technology LLC, Cupertino, CA (US)

(72) Inventors: Alok Dhawan, Shakopee, MN (US); Jon Paul Hurley, Bloomington, MN (US)

(73) Assignee: SEAGATE TECHNOLOGY, Cupertino, CA (US)

( * ) Notice: Subject to any disclaimer, the term of this patent is extended or adjusted under 35 U.S.C. 154(b) by 59 days.

(21) Appl. No.: 13/797,816

(22) Filed: Mar. 12, 2013

(65) Prior Publication Data

US 2013/0288077 A1 Oct. 31, 2013

Related U.S. Application Data

(60) Provisional application No. 61/637,941, filed on Apr. 25, 2012.

(51) Int. Cl.
| | | |
|---|---|---|
| B32B 38/18 | (2006.01) | |
| G11B 5/105 | (2006.01) | |
| G11B 13/04 | (2006.01) | |
| G11B 5/00 | (2006.01) | |

(52) U.S. Cl.
CPC .............. *G11B 13/045* (2013.01); *B32B 38/18* (2013.01); *G11B 5/105* (2013.01); *G11B 2005/0021* (2013.01); *Y10T 428/1179* (2015.01)

(58) Field of Classification Search
None
See application file for complete search history.

(56) References Cited

U.S. PATENT DOCUMENTS

| | | | |
|---|---|---|---|
| 5,570,184 A | 10/1996 | Armington et al. | |
| 5,963,662 A | 10/1999 | Vachtsevanos et al. | |
| 6,269,179 B1 | 7/2001 | Vachtsevanos et al. | |
| 8,345,517 B2 * | 1/2013 | Hurley et al. | 369/13.32 |
| 2002/0067751 A1 * | 6/2002 | Ohbuchi | 372/45 |
| 2009/0059411 A1 * | 3/2009 | Tanaka et al. | 360/59 |
| 2009/0108483 A1 * | 4/2009 | Suehira et al. | 264/40.5 |
| 2009/0153825 A1 * | 6/2009 | Edart et al. | 355/67 |
| 2010/0201805 A1 * | 8/2010 | Hamada et al. | 348/92 |
| 2011/0266469 A1 * | 11/2011 | Goulakov et al. | 250/505.1 |
| 2012/0056315 A1 * | 3/2012 | Chang et al. | 257/737 |
| 2012/0163138 A1 * | 6/2012 | Gage et al. | 369/13.11 |
| 2012/0287263 A1 | 11/2012 | Zhou | |
| 2013/0009269 A1 * | 1/2013 | Testa et al. | 257/448 |
| 2014/0048953 A1 * | 2/2014 | Pratt et al. | 257/774 |

OTHER PUBLICATIONS

Brown, "Confocal Metrology at the NPL", Olympus Illumin8 Newsletter, Issue 14, 2008, pp. 1-6.
Farrens et al., "Lights-out MEMS Manufacturing", Advanced Packaging, Aug./Sep. 2006, pp. 16-18.

* cited by examiner

*Primary Examiner* — Kevin Bernatz
(74) *Attorney, Agent, or Firm* — Hollingsworth Davis, LLC

(57) ABSTRACT

A bottom surface of an optical component is bonded to a mounting surface. The bottom surface includes a first opaque feature and the mounting surface includes a second opaque feature. The first and second opaque features are hidden between the bottom surface and the mounting surface after the bonding. An infrared image is obtained through a top surface of the optical component that is opposed to the bottom surface. The infrared image includes a view of a region proximate first and second opaque features. One or more of an optical alignment and a bond line thickness between the optical component and the mounting surface is determined via the infrared image.

19 Claims, 6 Drawing Sheets

DETERMINING AT LEAST ONE OF ALIGNMENT AND BOND LINE THICKNESS BETWEEN AN OPTICAL COMPONENT AND A MOUNTING SURFACE

CROSS REFERENCE TO RELATED CASES

This application claims the benefit of Provisional Patent Application Ser. No. 61/637,941 filed on Apr. 25, 2012, to which priority is claimed pursuant to 35 U.S.C. §119(e) and which is hereby incorporated herein by reference in its entirety.

SUMMARY

Various embodiments described herein are generally directed to aligning optical components. In one embodiment, a method involves bonding a bottom surface of an optical component to a mounting surface. The bottom surface includes a first opaque feature and the mounting surface includes a second opaque feature. The first and second opaque features are hidden between the bottom surface and the mounting surface after the bonding. An infrared image is obtained through a top surface of the optical component that is opposed to the bottom surface. The infrared image includes a view of a region proximate first and second opaque features. One or more of an optical alignment and a bond line thickness between the optical component and the mounting surface is determined via the infrared image.

In another embodiment, an apparatus includes a bottom surface and a top surface opposed to the bottom surface. The bottom surface includes a first opaque feature configured to be aligned with a second opaque feature of a mounting surface. The first and second opaque features are hidden between the mounting surface and the bottom surface after bonding of the apparatus to the mounting surface. At least one window region is between the bottom surface and the top surface. The window region is transparent to infrared light and configured to facilitate determining, via an application of infrared light to the top surface, at least one of a bond thickness and an optical alignment of the apparatus relative to the mounting surface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure relates to optical components used in applications such as heat assisted magnetic recording (HAMR). Generally, infrared microscopy is used to facilitate alignment and making other measurements between two optical components. One of the components includes windows that facilitate viewing features that are hidden (e.g., enclosed, covered, not visible to the eye) between mating surfaces of two optical component. While example embodiments are described in terms of HAMR read/write heads, the concepts described herein may be applicable to any optical and/or electrical device where precise alignment between two devices is required.

A HAMR device uses heat to overcome superparamagnetic effects that might otherwise limit the areal data density of typical magnetic recording media (e.g., hard drive disk). A HAMR device uses magnetic media with high coercivity at ambient temperatures. Recording HAMR media generally involves heating a small portion of the media while it is being written to by a magnetic write head. The hot spot may be created from a coherent light source such as a laser diode. Optical components may be integrated into a hard drive slider to direct energy from the laser diode to the media.

One way to achieve a tiny confined hot spot is to use an optical near-field transducer (NFT), such as a plasmonic optical antenna or an aperture, located near an air bearing surface of a hard drive slider. Light is launched from a light source (e.g., a laser diode) into an optical waveguide built into a slider from a core and cladding with different indices of refraction. The waveguide may include a high contrast between respective refractive indices of the core and cladding. Light propagating in the waveguide may be directed to an optical focusing element, such as a planar solid immersion mirror (PSIM), which may concentrate the energy into the optical NFT. In other configurations, the waveguide may delivery light to the NFT without using a focusing element, e.g., direct delivery.

The NFT and waveguide are examples of integrated optics devices formed within the slider. The field of integrated optics relates to the construction of optics devices on substrates, sometimes in combination with electronic components, to produce functional systems or subsystems. For example, light may be transferred between components via integrated optics waveguides that are built up on a substrate using layer deposition techniques. These waveguides may be formed using a first material as core, surrounded by a second material that acts as cladding. Other optical components may be formed in similar fashion, including the NFT and PSIM discussed above.

Figure 1:
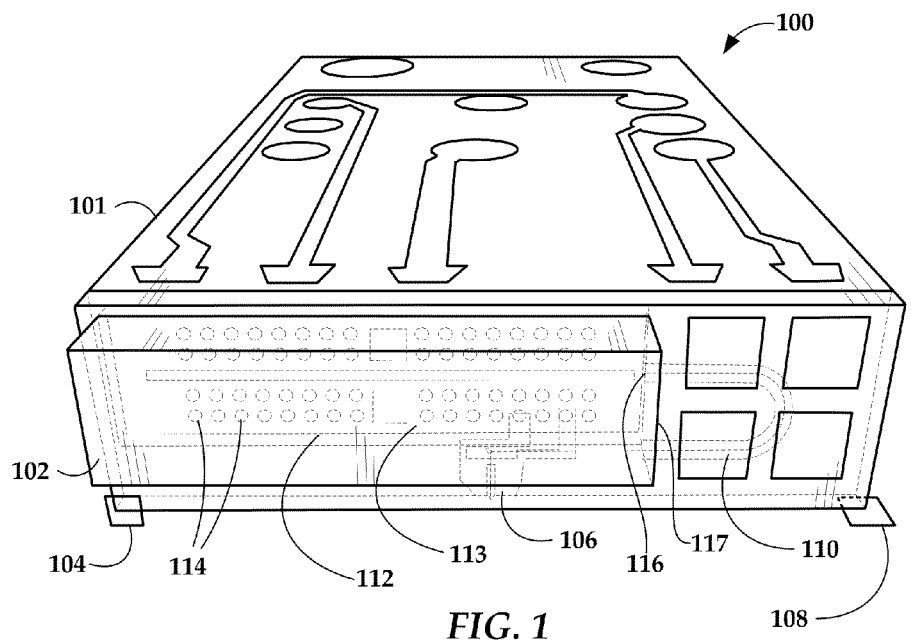
FIG. 1 is a perspective view of a hard drive slider assembly according to an example embodiment.

In one configuration, a laser light source (e.g., a laser diode) is formed or assembled integrally with the slider. This arrangement is referred to herein as laser-in-slider (LiS). Laser-in-slider assemblies may be built during wafer-level or slider-level manufacturing phases. In one configuration, an LiS device may be formed by assembling a separate laser diode component to the slider during slider manufacturing. This may require performing additional assembly and testing operations during slider manufacture. Precision and reliability of these assembly and testing operations help ensure acceptable yields for large-scale manufacture.

An example of a laser-in-slider device 100 according to an example embodiment is shown in the perspective view of FIG. 1. In this example, an edge-emitting laser diode 102 is integrated into a trailing edge surface 104 of the slider body 101. The laser diode 102 is integrated with a HAMR read/write head 106. The read/write head 106 has one edge located at a media-facing surface 108 (e.g., air-bearing surface) of the slider body 101. The media-facing surface 108 is held proximate to a moving media surface (not shown) during device operation. The laser diode 102 provides electromagnetic energy to heat the media surface at a point of the media near to where the read/write head 106 is positioned. Optical coupling components, such as a waveguide 110, are formed integrally (e.g., via layer deposition) within the slider body 101 to deliver light from the laser 102 to the media.

In this example, the laser diode 102 is recessed in a cavity 112 formed in the trailing surface 104 of the slider body 101. The bottom of the cavity 112 includes a bottom surface 113 that interfaces with a lower surface of the laser diode 102. The bottom surface 113 includes solder bumps 114 that interface with corresponding bumps/pads formed on the laser 102. These solder bumps 114 facilitate bonding the laser 102 to the slider body 101, provide electrical connectivity for the laser 102, and may provide other functions. For example, the solder bumps 114 may contribute to heat sinking the laser 102, assure proper alignment of an output facet 116 at an emission edge 117 of the laser 102 with the waveguide 110, etc.

Figure 2:
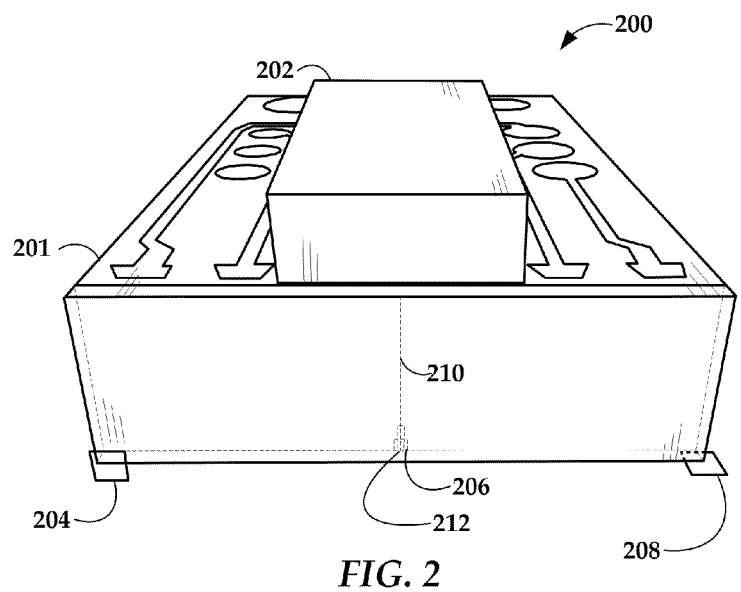
FIG. 2 is a perspective view of a hard drive slider assembly according to an example embodiment.

In another configuration, a laser light source is formed or assembled on an external surface of the slider. This arrangement is referred to herein as laser-on-slider (LoS). Laser-on-slider assemblies may also be built during wafer-level or slider-level manufacturing phases. In reference now to FIG. 2, a perspective view shows an example of a laser-on-slider device 200 according to an example embodiment. The slider 200 includes a laser diode 202 on top of the slider body 201 and near a trailing edge 204 of the slider body 201. The laser diode 202 provides electromagnetic energy to heat the media surface at a point near to a HAMR read/write head 206, the read/write head 206 located at a media-facing surface 208. The media-facing surface 208 is held proximate to a moving media surface (not shown) during device operation.

Optical coupling components, such as a waveguide 210, are formed integrally within the slider body 201 to deliver light from the laser 202 to the media. For example, a waveguide 210 and near-field transducer (NFT) 212 may be located proximate the read/write head 206 to provide local heating of the media during write operations. The laser diode 202 in this example may be an edge emitting device, the light being reflected into the waveguide 210 by a mirror or similar device.

Figure 3:
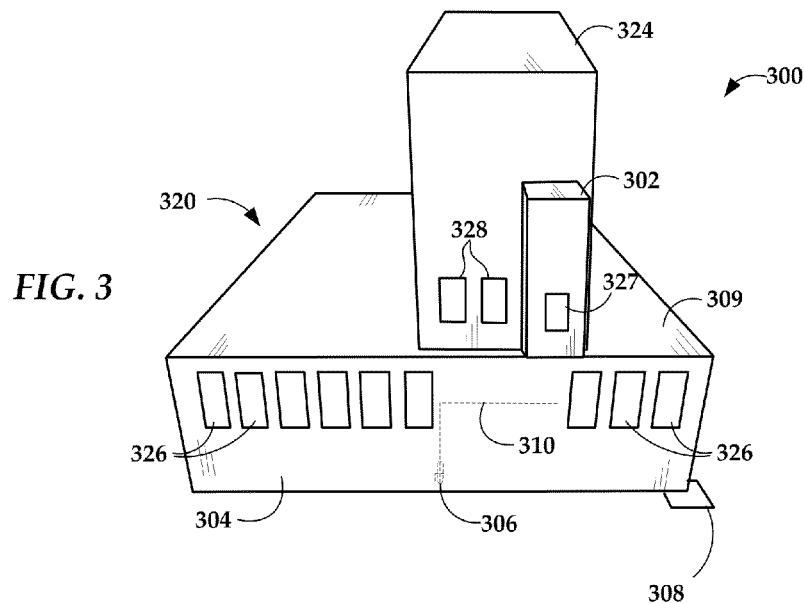
FIG. 3 is a perspective view of a hard drive slider assembly according to an example embodiment.

In FIG. 3, a perspective view shows another example of a laser-on-slider device 300 according to an example embodiment. The slider assembly 300 includes a slider body 320 having a media-facing surface 308 and a top surface 309. The media-facing surface 308 is held proximate to a moving media surface (not shown) during device operation. A read/write head region 306 is located at the media-facing surface 308 near a trailing edge 304 of the slider body 320. The read/write head region 306 includes respective one or more read transducers and write transducers, as well as an optical component (e.g., a near-field transducer) that directs a small beam of energy onto the media surface. The energy is provided by a laser (e.g., laser diode) 302 coupled to a submount 324, both of which are coupled to the top surface 309 of the slider body 320.

The laser diode 302 directs light to an optical interface (e.g., waveguide input coupler, not shown) of the slider body 320, where it is coupled to a waveguide 310 that directs light to the read/write head region 306. The laser diode 302 in this example is an edge firing laser diode, and may be coupled to the waveguide 310 via a facet, grating, lens or other coupling structure known in the art. Generally, the slider body 320 is an integrated optics device that is formed together with the waveguide 310 and read/write head region 306.

The laser diode 302 and submount 324 may also be formed using integrated optics or integrated circuit manufacturing processes. However, in this example, the laser diode 302 and submount 324 are not formed together with the slider body 320, e.g., using the same layer deposition processes. The laser 302 and submount 324 are formed separately and later attached together with the slider body 320 to form the slider assembly 300. The slider body 320, laser diode 302 and submount 324 have electrical connecting pads 326-328 that couple with other structures of the HAMR slider 300. The submount 324 provides mechanical and electrical connections between the laser diode 302, and slider body 320.

It will be appreciated that the slider assemblies described above may be used with any light source and light delivery mechanism. For example, surface emitting lasers (SEL) may be used instead of edge emitting lasers. The slider assemblies may use an integrated laser located on the top, side, trailing edge, etc., and/or the light may be provided by an externally mounted laser (not shown). In the latter case, the laser will be coupled to the slider body via an optic fiber or the like, and the interface between such an optic fiber and slider may be considered a laser/slider interface for purposes of the present discussion.

In all the above example configurations, precise optical alignment between the laser diode and slider body and/or submount helps minimize losses at the interface therebetween. In some cases, the measurement alignment between components as part of an assembly process is done with automated optical instruments (AOI) using alignment features that are present on the top surface of the components. However, a greater accuracy of measurement can be achieved if the alignment features of a component are on a surface that is directly being placed on another surface, e.g. mating surfaces of first and second components.

Generally, the present disclosure is related to using infrared microscopy to determine component-level, optical alignment between a laser and slider or laser and submount. For purposes of brevity, it will be understood that "mounting surface" may pertain to a surface of either the submount or slider, and "bottom surface," "laser surface," "laser mounting surface," etc., will refer to the surface of the laser that is joined to the mounting surface in an assembly operation. The term "mating surfaces" may refer to both of these surfaces in the plural. The term "optical alignment" generally refers to aligning of optically interfacing features, such as facets, waveguides, lenses, mirrors, etc.

One or both of a laser surface and its associated mounting surface may contain markings, e.g., fiducials, metallic traces, etc. These alignment features may be used to gauge final alignment and other metrics (e.g., bond line thickness) of the assembly, but are not visible to visible light AOI (e.g., instruments operating at visible light wavelengths) once the two components are assembled. By using a select combination of non-visible wavelengths (e.g., IR, ultraviolet) and materials to form the topmost component (the laser in these examples), microscopic imaging can be used to view these features on the assembled device. This allows for a more accurate measurement of the assembled product. In some cases (e.g., active alignment, rework), these features may also be used to assist in more accurate placement of components during assembly.

Figure 4:
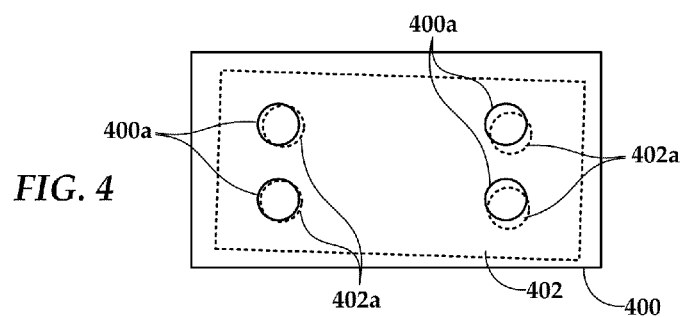
FIG. 4 is a plan view of an upper and lower component surfaces that interface with each other according to an example embodiment.

Examples described herein relate to using non-visible light to view alignment features in a post-laser-attach process. This enables determining alignment between the two components. The alignment tolerances may be on the order of 100 nm or less. For purposes of this discussion, "alignment" at least refers to determining whether features on substantially parallel mating surfaces are lined up with one another, which facilitates an optical alignment of other, optical features of the mating devices. An example is shown in FIG. 4, which illustrates a plan view of mating surface 400 and mating surface 402 that interface with each other according to an example embodiment. Mating surface 400 includes opaque features 400a, and mating surface 402 includes matching opaque features 402a.

For proper lateral alignment of the mating surfaces 400, 402, opaque features 400a should align with (e.g., overlap) opaque features 402a. While in this example, opaque features 400a, 402a are overlapping, other embodiments described below utilize non-overlapping opaque features. In those embodiments (described in greater detail below), the non-overlapping opaque features combine to form a geometric shape when the components are assembled, and this shape can be examined using AOI or other automated process to determine alignment.

In some cases, overall performance of the assembly may be sensitive to whether or not the surfaces 400, 402 are parallel within desired tolerances. Nonetheless, at this stage of inspection, determining lateral alignment between opaque features 400a, 402a may be sufficient for the intended purpose, assuming non-parallelism between the surfaces 400, 402 is small. As will be described below, other measurements may be used to determine the amount of angle, if any, between the surfaces 400, 402.

Figure 5:
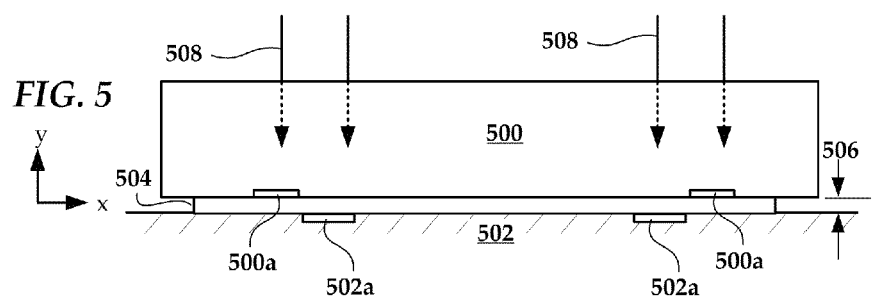
FIG. 5 is a side view of a laser diode bonded to a device according to an example embodiment.

The methods and apparatuses may also be able to determine bond thickness via opaque features, an example embodiment of which is shown in FIG. 5. This figure is a side view of a laser diode 500 bonded to a device 502 (e.g., slider or submount). A bond 504 between the laser diode 500 and device 502 has a bond line thickness 506. Laser diode 500, for example, could be bonded using solder as the bond 504 between conductive pads (not shown) of the laser diode 500 and device 502.

The bond line thickness for two components assembled with epoxy, solder or other bonding material may be determined by measuring the edge to edge distance 506 from a side view of the assembled components, e.g. using AOI. However, the components to be measured may have a poor edge quality and as a result AOI measurements of the bond line thickness may be susceptible to errors. In accordance with disclosed embodiments, IR imaging using window regions on an apparatus or laser diode may result in a more direct and accurate method to determine the actual bond line thickness between two assembled components.

It should be noted that both an average value of the bond line thickness 506 and a variation of the bond line thickness 506 may be useful in determining alignment between laser diode 500 and device 502. As discussed above in relation to FIG. 4, mating surfaces of laser diode 500 and device 502 may need to be parallel within a desired tolerance. By measuring bond thickness 506 at various locations, an angle between the surfaces of laser diode 500 and device 502 may be obtained. Such angle may be expressed as a single angle of rotation, or as two angular components on a device-defined axis.

Methods, systems, and apparatuses according to various embodiments may utilize of a confocal microscope with infrared light source to look through material of the topmost component (e.g., laser 500) to view markings/fiducials on the mating surfaces of the two components 500, 502. Confocal microscopy generally involves using point illumination and a spatial pinhole to obtain measurements of three-dimensional structures using obtained images. As seen in FIG. 5, a confocal microscope (not shown) may use IR illumination 508 to measure relative y-direction differences between markings 500a and 502a on respective laser 500 and device 502.

Figure 6:
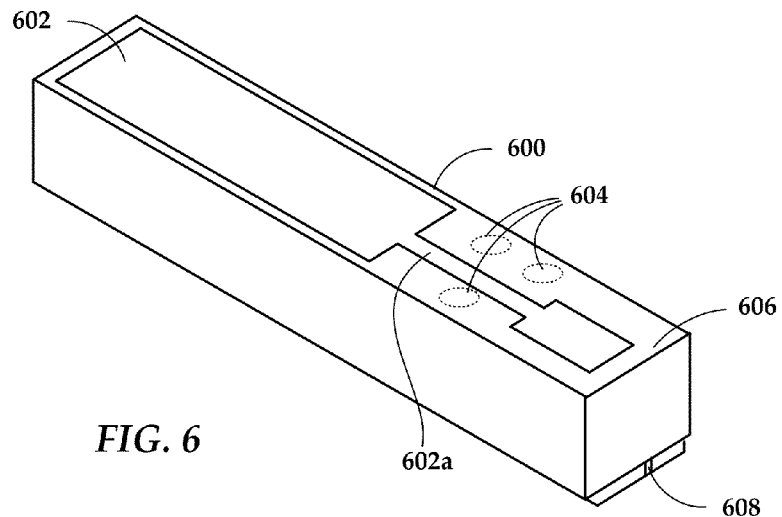
FIGS. 6 and 7 are perspective views of an apparatus according to an example embodiment.
Figure 7:
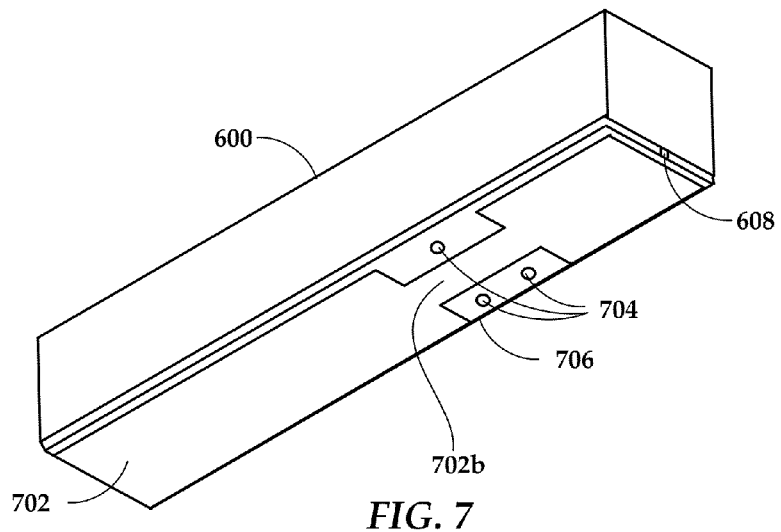

In reference now to FIGS. 6 and 7, respective top and bottom perspective views show an apparatus 600 according to an example embodiment, e.g., a laser diode. As seen in FIG. 6, laser diode 600 includes a conductive bonding pad 602 on a top surface 606. At least one window region 604 extends between the top surface 606 and a surface opposed to the top surface 606 (e.g., bottom surface 706 shown FIG. 7). The laser diode 600 may include a laser output facet 608 that optically couples into a submount or slider (not shown), and the window regions 604 may be used in the alignment between the laser diode 600 and the submount or slider.

Alignment may be performed by transmitting a specified light wavelength through the window region 604 to form an image of opaque features on the mating surfaces. The images are used in determining various measurements of the laser in relation to another device. The window region 604 may be transparent to infrared light, or some other range of non-visible light. The material of the window region 604 may dictate the range of light wavelengths that are able to pass through.

The transparency of the window 604 to a particular wavelength of light may be a natural result of material used in formation of a substrate of the laser diode 600, e.g., GaAs is transparent to IR light. In one implementation, it was found that an IR light source with wavelength of 1310 nm worked best for a GaAs substrate. In other configurations, the window 604 may be a manufactured feature, e.g., a via formed of a suitable material. In either case, other provisions will be made to facilitate the window region 604, such as avoiding the deposition of non-transparent materials (e.g., conductive traces) in the window regions 604 other than those markings/fiducials used for determining measurements. For example, conductive bonding pad 602 includes narrowed region 602a to facilitate viewing through window regions. Lower conductive pad 702 in FIG. 7 includes a similar narrowed region 702b. The window regions may be created by adding layers with the indicated shapes, and/or by removing metal layers (e.g., photomask and etch) from the top and bottom surfaces of the laser diode to expose the substrate and/or other material layers.

In reference to FIG. 7, the bottom surface 706 of apparatus 600 may include at least one conductive pad 702 and at least one opaque feature 704. The opaque features 704 are aligned with the window regions 604 and may include fiducial markings or other alignment and measurement features that are not (entirely) transparent at the wavelengths of interest. The conductive pad 702 is bonded (e.g., soldered) with a mating conductive pad on a mounting surface of another component or apparatus (not shown). When bonded, the conductive pad 702 and opaque feature 704 are hidden between the bottom surface 706 and the mounting surface.

Figure 8:
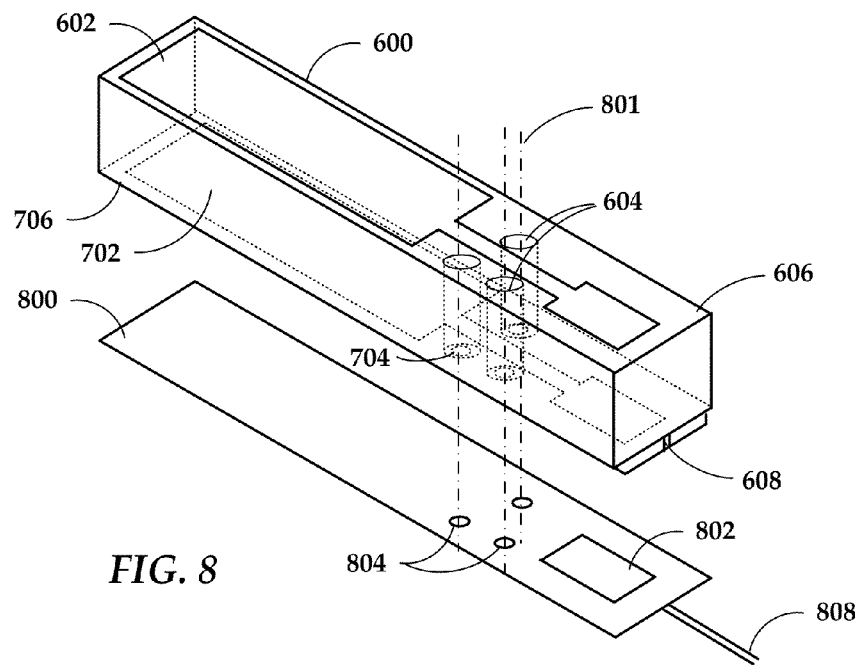
FIGS. 8 and 9 are perspective views showing a laser diode in close proximity to and mounted to a mounting surface, respectively, according to example embodiments.

In reference now to FIG. 8, a perspective view shows laser diode 600 in close proximity to a mounting surface 800. The laser diode 600 is bonded to the mounting surface 800 to at least electrically couple conductive pad 702 of the laser 600 to conductive pad 802 of the surface 800. The output facet 608 of the laser 600 should also be aligned with waveguide input coupler 808 when coupled to the surface 800. It should be noted that the surface 800 and waveguide input coupler 808 may be part of the same or different components. For example the surface 800 may be disposed on a submount that couples the laser 600 to a slider, and the waveguide input coupler 808 may be part of the slider (see FIG. 3).

As previously noted, window regions 604 of the laser 600 extend from the top surface 606 to the bottom surface 706 of the laser diode 600. As indicated by the dashed line paths, the windows 604 are transparent to various wavelengths and aligned with opaque features 704 located on the bottom surface 706 of the laser 600 and opaque features 804 disposed on mounting surface 800. In this example, an alignment is determined by ensuring that opaque features 704, 804 are not offset from one another.

In other embodiments, the opaque features 704, 804 may be non-overlapping, in which case other AOI techniques (e.g., measuring a geometric shape formed by the features 704, 804) can be used to ensure proper alignment. Proper alignment of the opaque features 704, 804 ensures proper alignment of the laser 600 to the surface 800, which in turn facilities aligning the laser output facet 608 to waveguide input coupler 808. Bond line thickness may also be determined via the opaque features 704, 804. One or both of average value and variance of the bond line thickness may affect alignment between the laser 600 and mounting surface 800. As such, determining bond line thickness may also facilitate aligning the laser output facet 608 to waveguide input coupler 808.

Figure 9:
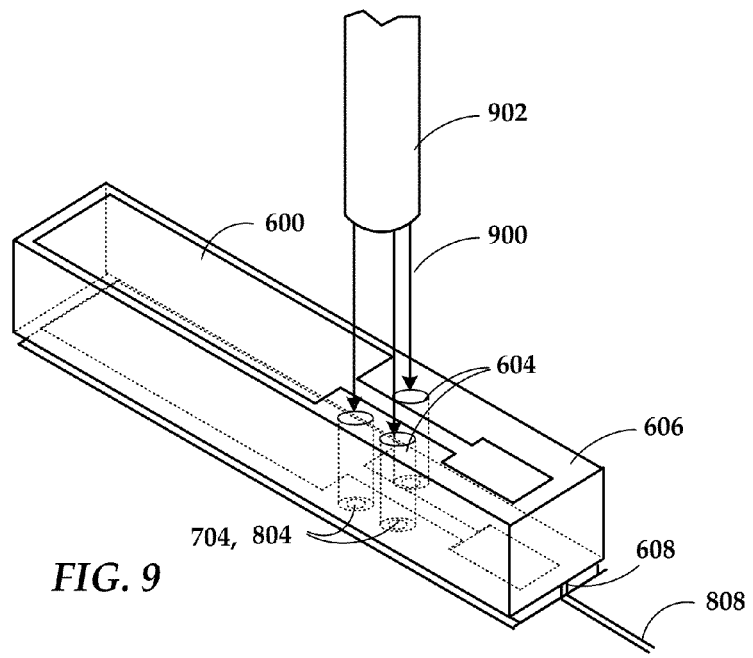

In FIG. 9, a perspective view shows laser diode 600 bonded to mounting surface 800. Conductive pad 702 of laser 600 is bonded (e.g., soldered) together with conductive pad 802 on the mounting surface 800. Once the laser diode 600 has been attached to the mounting surface 800, the conductive pads 702, 802 and opaque features 704, 804 are hidden between the bottom surface 706 and the mounting surface 800. To determine alignment and/or bond thickness, microscope 902 transmits light 900 through the window regions 604. Because the window regions 604 are transparent to light of a particular wavelength range (e.g., IR) the microscope 902 receives reflections of the light 900 from opaque features 704, 804. In this way, the microscope 902 determines alignment by detecting the opaque features 704, 804 and comparing offsets therebetween. To determine bond line thickness, the microscope 902 may include a confocal microscope. Reference distances of the opaque features 704, 804 along a direction normal to the mounting surface may be measured to determine bond line thickness. In such a case, the opaque features 704, 804 may be non-overlapping, e.g., see markings 500a and 502a in FIG. 5.

Opaque features or markings visible through a window region may be used in conjunction with opaque features or markings located on a mounting surface to facilitate the determining of a lateral position of a laser or other apparatus with respect to the mounting surface. Lateral position measurements may be used during and after placement of the laser, to facilitate aligning the placement of an apparatus to a mounting surface or to measure the alignment of a bonded apparatus to a mounting surface. The opaque features or markings may also be used to facilitate the determining of vertical position measurements. Vertical position measurements may include determining the bond thickness between components.

Figure 10:
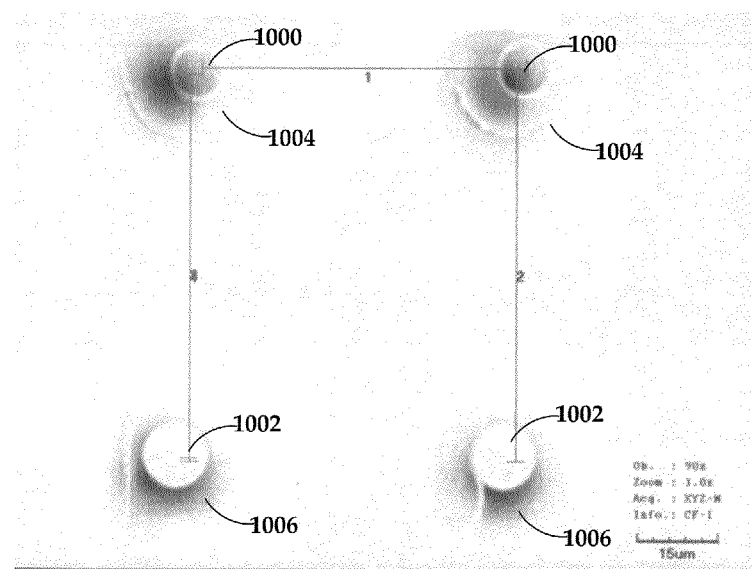
FIG. 10 is a microscope image showing determination of bond line thickness according to an example embodiment.

In reference now to FIG. 10, a photomicrograph shows an overhead IR view of a laser diode mounted to a slider component to illustrate an example alignment measurement. Opaque features 1000 are located on one of two mating surfaces of a laser and a submount or slider, and opaque features 1002 are located on another of the mating surfaces. The opaque feature 1000, 1002 are visible through respective a window regions 1004, 1006. A confocal microscope can measure relative distance between the opaque feature 1000, 1002 in a direction normal to the page. This relative distance can be used to determine bond thickness. Because there are two each of opaque features 1000, 1002, two distance measurements can be made. Having two or more opaque feature on each mating surface facilitates estimating other alignment values, such as how parallel the mating surfaces are to each other.

Figure 11:
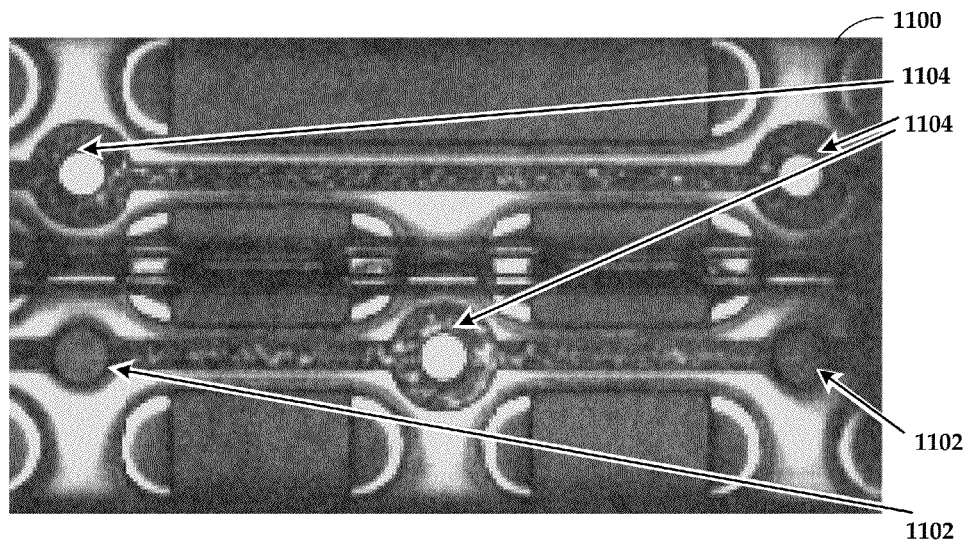
FIG. 11 is a microscope image showing determination of alignment according to an example embodiment.

In reference now to FIG. 11, an IR microscope image 1100 shows a top view of a laser diode with visible opaque features. The image 1100 is taken through a metal free window region of a laser diode and illustrates alignment of the laser diode to slider or submount according to an example embodiment. Opaque features 1102 are on lower surface of the laser, which includes under-bump metallization (UBM) pads that are bonded to pads on the submount or slider. Opaque features 1104 are located on the submount or slider. The opaque features 1102, 1104 are non-overlapping, and so alignment can be determined by looking at a geometric shape (e.g., line, square, etc.) formed by the features.

The confocal microscope may be used to transmit infrared or near-infrared light through each of the window regions. A measurement for each of the window regions is created based on the reflected IR or near IR light that is detected by the confocal microscope. One measurement or set of measurements may comprise the distance to the fiducial markings on the bottom surface of the window regions from the microscope's position of reference. Another measurement or set of measurements may comprise the distance to the fiducial markings on the mounting surface of the slider component from the microscope's position of reference. The difference in distance between the sets of measurements may then be used to formulate the bond line thickness. The bond line thickness is equivalent to the distance between the bottom surface of the laser diode and the mounting surface of the slider component.

Figure 12:
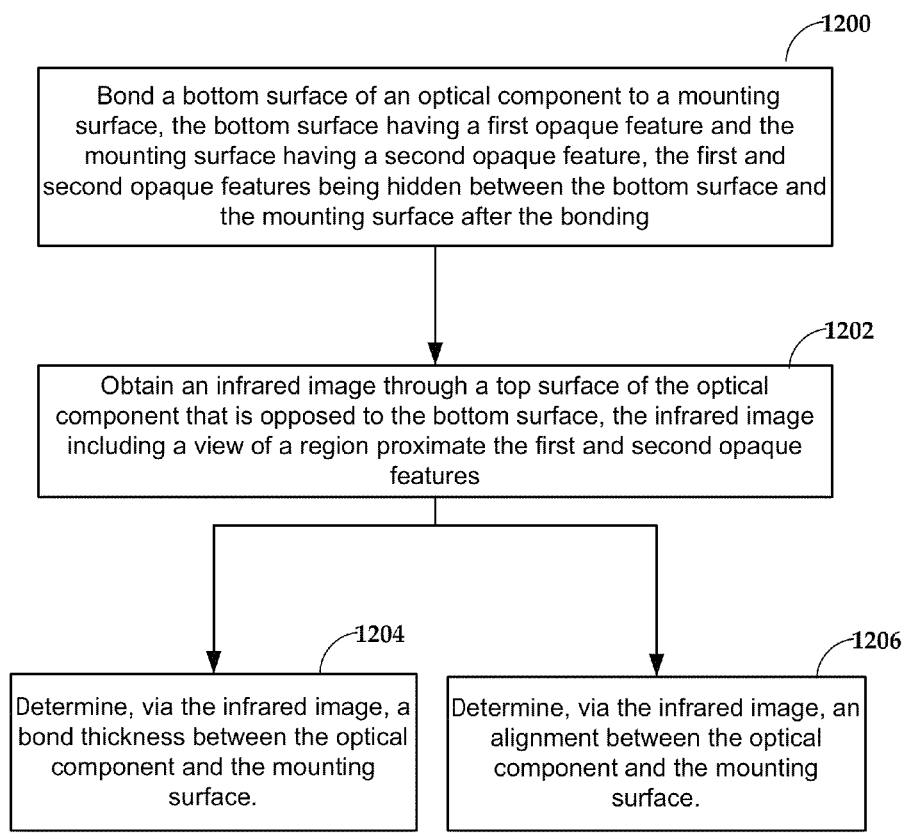
FIG. 12 is a flowchart illustrating a procedure according to another example embodiment.

In reference now to FIG. 12, a flowchart illustrates a method according to an example embodiment. The method involves bonding 1200 a bottom surface of an optical component to a mounting surface. The bottom surface has a first opaque feature and the mounting surface has a second opaque feature. The first and second opaque features are hidden between the bottom surface and the mounting surface after the bonding. The electronic component may include at least one window region over the first and second opaque features, the window region being transparent to infrared light. The electronic component may include a laser, in which case determining the alignment may facilitate optically aligning an output facet of the laser with a waveguide input coupler of a second optical component. The second optical component may include a slider body. In such a case, the mounting surface may be disposed a submount that couples the laser to the slider body, or disposed on the slider body itself.

An infrared image is obtained 1202 through a top surface of the electronic component that is opposed to the bottom surface. The infrared image includes a view of a region proximate the first and second opaque features. The method may involve one or both of operations 1204 and 1206. Operation 1204 involves determining, via the infrared image, a bond thickness between the electronic component and the mounting surface. Operation 1206 involves determining, via the infrared image, an alignment between the electronic component and the mounting surface. The first and second opaque features may be non-overlapping, in which case determining the alignment may involve determining a geometric shape formed by the features.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the disclosure not be limited with this detailed description, but rather determined by the claims appended hereto.

What is claimed is:

1. A method comprising:
   bonding a bottom surface of an optical component to a mounting surface, wherein the bottom surface comprises a first opaque feature and the mounting surface comprises a second opaque feature, wherein the first and second opaque features are hidden between the bottom surface and the mounting surface after the bonding;
   obtaining an infrared image via at least one window region over the first and second opaque features and through a top surface of the optical component that is opposed to the bottom surface, the infrared image comprising a view through at least part of the bottom surface of a region proximate the first and second opaque features, the at least one window region formed of GaAs and being transparent to infrared light; and
   determining, via the same infrared image, an optical alignment between the optical component and the mounting surface and a difference in distance between measurements of the first and second opaque features along a direction normal to the mounting surface, the difference in distance corresponding to a bond line thickness between the optical component and the mounting surface.

2. The method of claim 1, wherein the optical component comprises a laser, and wherein determining the optical alignment facilitates optically aligning an output facet of the laser with a waveguide input coupler of a second optical component.

3. The method of claim 2, wherein the second optical component comprises a slider body.

4. The method of claim 3, wherein the mounting surface is disposed a submount that couples the laser to the slider body.

5. The method of claim 3, wherein the mounting surface is disposed on the slider body.

6. The method of claim 1, wherein the first and second opaque features are non-overlapping, and wherein determining the alignment comprises determining a geometric shape formed by the first and second opaque features.

7. The method of claim 1, wherein the infrared image is obtained using an infrared light source with wavelength of 1310 nm.

8. The method of claim 1, wherein method is performed at a slider-level manufacturing phase.

9. A method comprising:
   bonding a bottom surface of an optical component to a mounting surface, wherein the bottom surface comprises a first opaque feature and the mounting surface comprises a second opaque feature, wherein the first and second opaque features are hidden between the bottom surface and the mounting surface after the bonding;
   obtaining an infrared image through a top surface of the optical component that is opposed to the bottom surface, the infrared image comprising a view through at least part of the bottom surface of a region proximate the first and second opaque features; and
   determining, via the infrared image, a difference in distance between measurements of the first and second opaque features along a direction normal to the mounting surface, the difference in distance corresponding to a bond line thickness between the optical component and the mounting surface.

10. The method of claim 9, wherein the optical component comprises at least one window region over the first and second opaque features, the at least one window region being formed of GaAs and being transparent to infrared light.

11. The method of claim 10, wherein the infrared image is obtained using an infrared light source with wavelength of 1310 nm.

12. The method of claim 9, wherein the optical component comprises a laser, and wherein determining the bond line thickness facilitates optically aligning an output facet of the laser with a waveguide input coupler of a second optical component.

13. The method of claim 12, wherein the second optical component comprises a slider body.

14. The method of claim 13, wherein the mounting surface is disposed a submount that couples the laser to the slider body.

15. The method of claim 13, wherein the mounting surface is disposed on the slider body.

16. The method of claim 9, wherein determining the bond line thickness comprises determining the difference in distance via a confocal microscope.

17. The method of claim 16, wherein the first and second opaque features are non-overlapping.

18. The method of claim 9, further comprising determining, via the infrared image, an optical alignment between the optical component and the mounting surface.

19. The method of claim 9, wherein method is performed at a slider-level manufacturing phase.

* * * * *